United States Patent [19]
Akashi et al.

[11] 4,002,804
[45] Jan. 11, 1977

[54] MAGNETIC RECORDING MATERIAL

[75] Inventors: Goro Akashi; Masaaki Fujiyama; Nobutaka Yamaguchi; Satoru Takayama; Koji Sasazawa, all of Odawara, Japan

[73] Assignee: Fuji Photo Film Co., Ltd., Minami-ashigara, Japan

[22] Filed: July 31, 1975

[21] Appl. No.: 600,689

[30] Foreign Application Priority Data

July 31, 1974 Japan .............................. 49-88416

[52] U.S. Cl. .............................. 428/539; 428/900; 427/132; 252/62.54; 252/62.56
[51] Int. Cl.$^2$ ......................................... B23B 15/00
[58] Field of Search ........... 428/539, 900; 427/132; 252/62.54, 62.56

[56] References Cited
UNITED STATES PATENTS

| | | | |
|---|---|---|---|
| 3,031,341 | 4/1962 | Eschenfelder | 428/900 X |
| 3,337,075 | 8/1967 | Stein | 428/900 X |
| 3,547,693 | 12/1970 | Huguenard | 428/900 X |
| 3,653,962 | 4/1972 | Akashi et al. | 428/900 X |
| 3,740,266 | 6/1973 | Akashi et al. | 252/62.54 X |
| 3,821,025 | 6/1974 | Akashi et al. | 252/62.54 X |
| 3,824,128 | 7/1974 | Akashi et al. | 428/900 X |
| 3,833,412 | 8/1974 | Akashi et al. | 428/539 X |

Primary Examiner—Ralph S. Kendall
Assistant Examiner—Charles R. Wolfe, Jr.
Attorney, Agent, or Firm—Sughrue, Rothwell, Mion, Zinn & Macpeak

[57] ABSTRACT

A magnetic recording material which comprises a support having thereon a magnetic recording layer comprising a ferromagnetic substance and a binder, wherein the ferromagnetic substance comprises a mixture of (1) a Berthollide iron oxide having a particle size of about 0.5 $\mu$ or larger and a degree of oxidation represented by the value of $x$ in $FeO_x$ of $1.33 < x \leq 1.45$ and (2) a Berthollide iron oxide having a particle size of about 0.4 $\mu$ or smaller and a degree of oxidation represented by the value of $x$ in $FeO_x$ of $1.43 \leq x < 1.50$, in which the weight ratio of Berthollide iron oxide (1) to Berthollide iron oxide (2) ranges from about 1:4 to 4:1.

13 Claims, 2 Drawing Figures

MAGNETIC RECORDING MATERIAL

BACKGROUND OF THE INVENTION

1. Field of the Invention

The present invention relates to a magnetic recording material such as a video tape, an audio tape, a memory tape, an audio cassette tape, a magnetic disc, a magnetic card, or the like. More particularly, it relates to a magnetic recording material superior to known magnetic recording materials especially in envelope wave form characteristics and further having balanced properties such as video S/N, magnetic print through of audio signal and chroma output, etc. Hereinafter, even though the invention is applicable to all types of magnetic recording medium forms, for simplicity, the description will be given mainly with reference to a helical type VTR tape, since the effect of the present invention is particularly marked for a helical type VTR and further since it is presently, in general, thought that VTR tapes require the highest level of magnetic recording and reproducting techniques.

2. Description of the Prior Art

In general, a magnetic recording material has a structure in which a magnetic recording layer is formed on one surface of a non-magnetic support and, if desired, an electroconductive and lubricating layer is formed on the other surface of the support. However, in most cases, the electroconductive layer or the lubricating layer is omitted. In special cases, magnetic recording layers or lubricating layers can be formed on both surfaces of the support.

Non-magnetic materials are used in most cases as the support, however, in special cases, a magnetic layer is added to prevent magnetic print through.

The magnetic recording layer mainly comprises a ferromagnetic material and a binder.

The ferromagnetic material can be classified by shape as needle-like, granular, plate-like and spindle-shaped, however, a ferromagnetic material with a needle-like or granular shape is mainly used.

The ferromagnetic material can also be classified as follows:

i. iron oxide group ferromagnetic materials such as $\gamma$-$Fe_2O_3$, $Fe_3O_4$, or those iron oxide group materials additionally containing metal atoms such as Co, Ni, Mn or Cr, as disclosed in Japanese Pat. Publication Nos. 5515/1961 (corresponding to U.S. Pat. No. 3,046,158), 6538/1966, 6113/1967, 10994/1973, 15759/1973, 27118/1973 (corresponding to U.S. Pat. No. 3,794,519), U.S. Pat. Nos. 3,117,933, 3,573,983, 3,652,334, 3,671,435 and 3,748,270.

ii. alloy group ferromagnetic materials which mainly contain at least one metal selected from Fe, Co, Ni or a mixture thereof, i.e., Fe, Co, Ni, Fe—Co, Fe—Ni, Co—Ni, Fe—Co—Ni, as main components and additionally containing other metals such as B, Al, P, Sc, V, Cr, Mn, Cu, Zn, Ga, As, Se, Y, Zr, Mo, Ru, Rh, Ag, Sn, Sb, Te, W, Au, Pb, and Bi, etc., as disclosed in Japanese Patent Publication Nos. 41158/1972 (corresponding to U.S. Pat. No. 3,767,464), 41719/1972 (corresponding to U.S. Pat. No. 3,607,218), 23755/1973 (corresponding to U.S. Pat. No. 3,607,675) and 1997/1974 (corresponding to U.S. Pat. No. 3,726,664), and Japanese Pat. Application (OPI) Nos. 5057/1971 (corresponding to U.S. Pat. No. 3,634,063), 1353/1972 (corresponding to U.S. Pat. No. 3,756,866), 13032/1972 (corresponding to U.S. Pat. No. 3,790,407), 28999/1973 (corresponding to U.S. Pat. Application Serial No. 492,819, filed July 7, 1974), 79153/1973 (corresponding to U.S. Pat. No. 3,748,119), 41899/1974 (corresponding to U.S. Pat. No. 3,837,912), 43604/1974 (corresponding to U.S. Pat. No. 3,865,627) and 99004/1974 (corresponding to U.S. Pat. Application Ser. No. 320,630, filed Jan. 2, 1973).

iii. other ferromagnetic materials such as $CrO_2$ or those materials additionally containing Te, Sb or other metals (e.g., B, Al, Ca, V, Fe, Cu, Y, Zr, Mo, Sn, W, Pb, etc.), as disclosed in Japanese Pat. Publication Nos. 11617/1967 (corresponding to U.S. Pat. No. 3,278,263), 28366/1969 (corresponding to U.S. Pat. No. 3,449,073), 43437/1973 (corresponding to U.S. Pat. No. 3,819,411), and 41759/1974 (corresponding to U.S. Pat. application Ser. No. 284,003, filed Aug. 28, 1972), and U.S. Pat. Nos. 3,371,043, 3,512,930, 3,574,115, 3,585,141, 3,586,630, 3,647,540, 3,687,726, 3,696,039, 3,736,181 and 3,769,087, etc.

On the other hand, the characteristics required for magnetic recording materials become more sophisticated year after year. Particularly, the requirements for helical type video tapes are severe.

In general, the recording density of a magnetic recording material is about 5 $\mu$ or higher when calculated in terms of recording wavelength. However, the recording density of a helical type video tape ranges from about 1.5 to 3 $\mu$, that is, the highest technical level possible today is required.

Since a signal of short wavelengths is recorded in a helical type magnetic video tape, the in-put or out-put signal is affected by the degree of roughness on the surface of the video tape used and further the particle sizes and magnetic properties of the ferromagnetic material employed particularly affect the video S/N ratio. Accordingly, it is necessary to decrease the size of the particles in order to improve the video S/N ratio, but the properties of the magnetic print through the audio signal of the video tape become poor.

Heretofore, the following disadvantages have occurred when such video tapes for recording a short wavelength are produced using an iron oxide ferromagnetic material containing cobalt metal atoms.

(1) The envelope wave form of the output signal is distorted.

(2) The balance between the video S/N ratio and the magnetic print through of audio signal ratio is difficult to control.

Particularly, the distortion of the envelope wave form greatly affects the video image quality, and accordingly is undesired for practical use.

Heretofore, improvements in the video S/N ratio have been achieved by the multiplication effect of decreasing the particle size of the ferromagnetic substance, that is, fine graining, and decreasing the degree of the roughness of the surface of magnetic recording layer to improve the sensitivity of the ferromagnetic medium. On the other hand, improvements in chroma output and magnetic print through of audio signal have been achieved by improvements in the characteristics of a ferromagnetic material and improvements in the squareness ratio (Br/Bm) in the magnetization curve (B-H curve) of a magnetic recording tape. However, no techniques or approaches to improve the envelope wave form fluctuation factor have been proposed in the prior art.

The video output wave form preferably always has a constant maximum level of reproducing output when the recording input level is constant as shown in FIG. 1 (the ideal output wave form). However, the actual output fluctuates as shown in FIG. 2 (an actual output wave form) due to non-uniform contact between the magnetic head and the magnetic tape and other reasons.

Although there is no standard method in the art for representing this fluctuation of the output level, it has been defined in the present invention in order to be able to quantitatively evaluate the fluctuation. In the present invention, the envelope wave form fluctuation factor is defined as the ratio of the output fluctuation width to the maximum output level.

In the present invention, evaluations of the envelope wave form were conducted using the following relationship (I):

$$(Vo/Vs) \times 100 = \text{Envelope Wave Form Fluctuation Factor (\%)} \quad (I)$$

wherein Vs represents half of the peak-to-peak value of the carrier signal output and Vo represents the width of the fluctuation of the carrier signal output.

According to this evaluation method, fluctuation factors obtained using known technical levels are greater than 15%, however, this factor is preferably less than 13%.

Research on improving the envelope wave form using iron oxide group ferromagnetic materials has now been made and a magnetic recording material has been found which provides an improvement in the envelope wave form but does not degrade the other characteristics such as video S/N ratio, magnetic print through of audio signal ratio and chroma output, etc.

SUMMARY OF THE INVENTION

Therefore, an object of the present invention is to provide a magnetic recording material which improves the fluctuation of the output signal level (hereinafter designated "fluctuation factor") which is important when the relative speed between a magnetic head and a tape is greater than about 1 m/sec as in helical type VTRs, 4-head type VTRs, or fixed head type VTRs or when the recording wavelength is extremely small, for instance, less than about 4 $\mu$.

Another object of the present invention is to provide a magnetic recording material in which the envelope wave form fluctuation factor is improved and at the same time the video S/N, magnetic print through of audio signal and chroma output are improved.

The above-described objects of the present invention are attained with a magnetic recording material which comprises a support having thereon a magnetic recording layer comprising a ferromagnetic material and a binder, wherein the ferromagnetic material comprises a mixture of (1) a Berthollide iron oxide having a particle size of about 0.5 $\mu$ or larger and a degree of oxidation represented by the value of $x$ in $FeO_x$ of $1.33 < x \leq 1.45$ and (2) a Berthollide iron oxide having a particle size of about 0.4 $\mu$ or smaller and a degree of oxidation represented by the value of $x$ in $FeO_x$ of $1.43 \leq x < 1.50$, with the weight ratio of Berthollide iron oxide (1) to Berthollide iron oxide (2) ranging from about 1:4 to 4:1.

BRIEF DESCRIPTION OF THE DRAWINGS

In FIG. 2, Vo represents the fluctuation width of the carrier signal output and Vs represents the peak-to-peak half value of the carrier signal output.

DETAILED DESCRIPTION OF THE INVENTION

Figure 1:
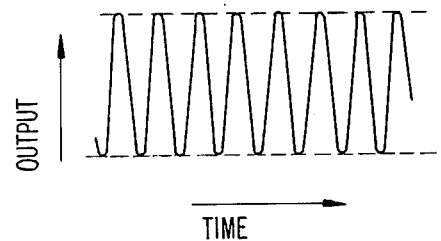
FIG. 1 shows an ideal video output wave form.
Figure 2:
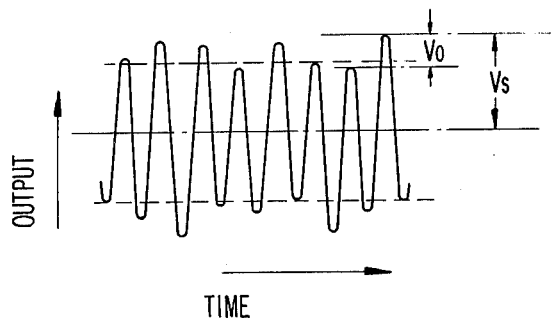
FIG. 2 shows an actual video output wave form.

The ferromagnetic iron oxides used for the present invention can be produced using methods as described in Japanese Patents 5009/64, 10307/64 and 39639/73.

Maghemite ($\gamma$-$Fe_2O_3$) and magnetite ($Fe_3O_4$) can be used as the iron oxide, but Berthollide iron oxide ($FeO_x$ where $x$ is the oxidation degree) (which is disclosed in Japanese Patent Publication Nos. 5009/64, 10307/64 and 39639/73) is especially effective presumably because diffusion of Co into such an oxide is easy. Berthollide iron oxides ($FeO_x$) having an oxidation degree as defined by the following relationship of about 15 to 90% are especially effective.

$$\text{Degree of Oxidation} = 1 - \frac{300 - y}{100 - y} \cdot R$$

wherein y represents the divalent atomic percent of metal ions other than $Fe^{++}$, and R is the ratio of $Fe^{++}/Fe^{++} + Fe^{+++}$.

In the above-described Berthollide iron oxide, $x$ ranges from more than 1.33 to less than 1.50, preferably 1.36 to 1.49. Berthollide iron oxide is produced by following processes.

a. A reduction of maghemite ($FeO_x$, $x = 1.50$) to magnetite ($FeO_x$, $x = 1.33$) where the reduction is stopped when $1.33 < x < 1.50$ as set forth in Japanese Pat. Publication Nos. 5009/64 and 39639/73.

b. An oxidation process of magnetite to maghemite where the oxidation is stopped when $1.33 < x < 1.50$ as described in Japanese Pat. Publication Nos. 5009/64 and 10307/64.

Berthollide iron oxide produced by processes as described above is an iron oxide having an oxidation degree between that of magnetite ($Fe_3O_4$:$FeO_x$, $x = 1.33$) and the maghemite ($\gamma$-$Fe_2O_3$:$FeO_x$, $x = 1.50$), and having a very high coercive force, decreased electrical resistance, and improved dispersibility in an organic solvent. Thus, the print-through effect of a recorded signal to another magnetic recording layer is decreased. On the other hand, maghemite and magnetite can be used in combination, and the characteristics thereof are similar but not superior to those of the above-described Berthollide iron oxide.

These ferromagnetic iron oxides include maghemite ($\gamma$-$Fe_2O_3$), magnetite ($Fe_3O_4$), and Berthollide compounds thereof obtained by oxidizing or reducing these oxides.

The relations of these iron oxides and $x$ value represented by $FeO_x$ are shown in Table 1.

TABLE 1

| Ferromagnetic Iron Oxide | Magnetite | Berthollide Compound | Maghemite |
|---|---|---|---|
| x Value | x = 1.33 | 1.33 < x < 1.50 | x = 1.50 |

The magnetic recording material of the present invention contains ferromagnetic iron oxides having an $x$ value, a particle size and a mixing ratio as shown in Table 2.

TABLE 2

| $FeO_x$ | x Value | | Particle Size | Mixing Ratio of (1) and (2) |
| --- | --- | --- | --- | --- |
| Ferromagnetic Berthollide Iron Oxide (1) | $1.33 < x$ | 1.45 | More than about 0.5 μ | About 1 – 4 |
| Ferromagnetic Berthollide Iron Oxide (2) | 1.43 | $x < 1.50$ | Less than about 0.4 μ | About 4 – 1 |

It can be understood from Table 1 and Table 2 that a suitable range of the $x$ value of the ferromagnetic Berthollide iron oxide (1) of the present invention is $1.33 < x \leq 1.45$, preferably $1.36 \leq x \leq 1.45$, and a suitable range of the $x$ value of the ferromagnetic Berthollide iron oxide (2) is $1.43 \leq x < 1.50$, preferably $1.43 \leq x \leq 1.49$.

Further, a suitable range of the particle size of the ferromagnetic Berthollide iron oxide (1) is from about 0.5 to 1.5 μ and that of the ferromagnetic Berthollide iron oxide (2) is from about 0.2 to 0.4 μ, since ferromagnetic iron oxides having a particle size of less than about 0.2 μ or more than about 1.5 μ are not very needle-shaped, cannot be oriented well and do not provide good magnetic characteristics.

If the mixing ratio by weight of the ferromagnetic Berthollide iron oxide (1) to the ferromagnetic Berthollide iron oxide (2) is not within the range of about 1:4 to 4:1, the envelope wave form fluctuation factor represented by the relationship (I) is about 13% or more and is not preferred because of this.

In the present invention, the relationship indicated by the envelope wave form fluctuation factor is about 13% or less, preferably about 10% or less.

Further, the ferromagnetic Berthollide iron oxides (1) and (2) can be mixtures of two or more of each of the Berthollide iron oxides (1) and (2) having the characteristics as set forth above.

A divalent metal such as cobalt, magnesium, copper, chromium, manganese, nickel, zinc, molybdenum, tin, antimony, tellurium, rhodium, barium, lanthanum, cerium, tungsten, or bismuth, etc., can be added to the above-described iron oxides. Of these metals, cobalt provides particularly good magnetic characteristics. A suitable amount of the divalent metals to be added can range from about 0.5 to 15 atom %, however, a range of 1 to 10 atom % is preferred to adjust the coercive force (Hc) of the iron oxide to about 500 to 1500 Oe.

The thus-prepared ferromagnetic iron oxide of the present invention is then dispersed into a binder and then applied to a support to obtain a magnetic recording layer.

The ferromagnetic powder of this invention can be dispersed in a binder, and coated on a support, followed by drying to form a magnetic recording medium such as a tape, a disc, a sheet, etc.

Binders which can be used together with the ferromagnetic powder materials of the present invention include conventional thermoplastic resins, thermosetting resins and mixtures thereof. These resins can be used individually or in the form of a mixture thereof.

Useful thermoplastic resins have a softening point of lower than about 150° C, a mean molecular weight of about 10,000 to 200,000 and a degree of polymerization of about 200 to 2,000, and include the following polymers; vinyl chloride-vinyl acetate copolymers, vinyl chloride-vinylidene chloride copolymers, vinyl chloride-acrylonitrile copolymers, acrylic ester-vinylidene chloride copolymers, acrylic ester-styrene copolymers, methacrylic ester-acrylonitrile copolymers, methacrylic ester-vinylidene chloride copolymers, methacrylic ester-styrene copolymers, urethane elastomers, polyvinyl fluoride resins, vinylidene-chloride-acrylonitrile copolymers, butadiene-acrylonitrile copolymers, polyamide resins, polyvinyl butyral, cellulose derivatives (cellulose acetate butyrate, cellulose diacetate, cellulose triacetate, cellulose propionate, nitrocellulose), styrene-butadiene copolymers, polyester resins, chlorovinyl ether-acrylic ester copolymers, amino resins, various synthetic rubber resins and mixtures thereof.

These thermoplastic binder resins are described in Japanese Pat. Publication Nos. 6877/62, 12528/64, 19282/64, 5349/65, 20907/65, 9463/66, 14059/66, 66985/66, 6428/67, 11621/67, 4623/68, 15206/68, 2889/69, 17947/69, 18232/69, 14020/70, 14500/70, 18573/72, 22068/72, 22069/72, 22070/72, and 27886/72, and U.S. Pat. Nos. 3,144,352, 3,419,420, 3,499,789 and 3,713,887.

Useful thermosetting resins have a molecular weight of less than about 200,000 as a coating solution, but the molecular weight becomes infinity due to the condensation and addition reactions occurring on heating the coating solution. Such resins are preferably not softened or melted before they thermally decompose. Examples of thermosetting resins are phenol resins, epoxy resins, polyurethane hardening resins, urea resins, melamine resins, alkyd resins, silicone resins, acrylic reactive resins, epoxy-polyamide resins, nitrocellulose-melamine resins, a mixture of a high molecular weight polyester resin and an isocyanate prepolymer, a mixture of a methacrylic copolymer and a diisocyanate prepolymer, a mixture of a polyesterpolyol and a polyisocyanate, urea-formaldehyde resins, a mixture of a low molecular weight glycol, a high molecular weight diol and triphenylmethanetriisocyanate, polyamine resins and mixtures thereof.

These resins are described in Japanese Pat. Publication Nos. 8103/64, 9779/65, 7192/66, 8106/66, 14275/66, 18179/67, 12081/68, 28023/69, 14501/70, 24902/70, 13103/71, 22065/72, 22066/72, 22067/72, 22072/72, 22073/72, 28045/72, 28048/72 and 28922/72, and U.S. Pat. Nos. 3,144,353, 3,320,090, 3,437,510, 3,597,273, 3,781,210, and 3,781,211.

The binder can be used individually or as mixtures thereof. Other ingredients, such as dispersing agents, lubricants, abrasive agents and anti-static agents, can be added to the binder.

Useful dispersing agents which can be employed include, for example, fatty acids represented by the formula $R_1COOH$ (where $R_1$ is an alkyl or alkenyl group having 11 to 17 carbon atoms), e.g., caprylic acid, capric acid, lauric acid, myristic acid, palmitic acid, stearic acid, oleic acid, elaidic acid, linolic acid, linolenic acid, stearolic acid, etc., alkali metal (Li, Na, K, etc.) or alkaline earth metal (Mg, Cs, Ba, etc.) salts of these fatty acids, and lecithin. Higher alcohols having more than 12 carbon atoms and the sulfuric esters thereof can be used.

Such a dispersing agent is employed in the binder in a weight ratio of the dispersing agent to the binder of about 0.5:100 to 20:100. Suitable dispersing agents are described in Japanese Pat. Nos. 28369/64, 17945/69 and 15001/73, U.S. Pat. Nos. 3,387,993 and 3,470,021.

Useful lubricants are silicone oils, graphite, molybdenum disulfide, tungsten disulfide, fatty acid esters of monocarboxylic fatty acids having 12 to 16 carbon atoms and monohydric alcohols having 3 to 12 carbon atoms, and fatty acid esters of monocarboxylic fatty acids having more than 17 carbon atoms and monohydric alcohols, in which the total number of carbon atoms in the ester is 15 to 28. 0.2 to 20 weight parts of such a lubricant are generally employed per 100 parts of the binder. These lubricants are described in Japanese Patent Publication No. 23889/68, Japanese Pat. Application Nos. 28647/67 and 81543/68, U.S. Pat. Nos. 2,654,681, 3,274,111, 3,276,946, 3,293,066, 3,398,011, 3,470,021, 3,492,235, 3,523,086, 3,625,760, 3,630,772, 3,634,253, 3,647,539, and 3,687,725, Canadian Pat. Nos. 535,575 and 728,591, British Pat. No. 793,520, and German Pat. No. (DT-AS) 1,221,282, etc.

Useful abrasives are fused alumina, silicon carbide, chromium oxide, corundum, synthetic corundum, diamond, synthetic diamond, garnet and emery (main components are corundum and magnetite). A suitable abrasive has a mean particle size of about 0.05 to 2 $\mu$m, preferably 0.1 to 2 $\mu$m. Generally about 0.5 to 20 weight parts of the abrasive particles are employed per 100 weight parts of the binder. These abrasives are described in Japanese Pat. Application No. 26749/73, U.S. Pat. Nos. 3,007,807, 3,293,066, 3,630,910 and 3,687,725, British Pat. No. 1,145,349, and German Pat. No. (DT-PS) 853,211, etc.

Useful anti-static agents are inorganic materials such as carbon black; organic materials such as saponin or like natural surfactants, alkyleneoxides, glycerin, glycidol or like nonionic surfactants, higher alkylamines, quaternary ammonium salts, pyridinium or like heterocyclic compounds, phosphonium, sulfonium or like cationic surfactants, carboxylic acids, sulfonic acids, phosphoric acids, anionic surfactants containing sulfuric acid ester groups, phosphoric acid ester groups or like acidic groups, aminoacids, aminosulfonic acids, sulfuric or phosphoric esters of aminoalcohols or like ampholytic surfactants. A suitable amount of the inorganic material is about 5% by weight and of the organic material is about 0.5 to 1% by weight, each based on the weight of the ferromagnetic material.

Some of these surfactant compounds used as the anti-static agents are described in U.S. Pat. Nos. 2,271,623, 2,240,472, 2,288,226, 2,676,122, 2,676,924, 2,676,975, 2,691,566, 2,727,860, 2,730,498, 2,742,379, 2,793,891, 3,068,101, 3,158,484, 3,201,253, 3,210,191, 3,294,540, 3,415,649, 3,441,413, 3,442,654, 3,475,174 and 3,545,974, German Pat. Application (OLS) No. 1,942,665, British Pat. Nos. 1,007,317 and 1,198,450, R. Oda et al., *Synthesis of the Surface Active Agents and Their Applications*, Maki Shoten (1964), A. M. Schwartz et al., *Surface Active Agents*, Interscience Publications Inc., (1958), J. P. Sisley et al., *Encyclopedia of Surface Active Agents*, Vol. 2, Chemical Publishing Co., (1964), and *Surface Active Agent Handbook*, 6th Edition, Sangyo Tosho K.K., (Dec. 20, 1966).

These surface active agents can be used individually or as mixtures. The surfactant is used not only for inhibiting the formation of static electricity but also for improving the dispersing, lubricating and coating properties and the magnetic properties of the resulting recording member.

The formation of the magnetic recording layer can be carried out by dispersing the iron oxide mixture in an organic solvent and applying the resulting composition on a support. A suitable coating thickness of the magnetic layer on the support ranges from about 0.5 to 20 $\mu$m, preferably 2 to 15 $\mu$m.

The non-magnetic support can, in general, have a thickness of about 10 to 125 $\mu$m, and for a helical type video tape, a thickness of about 5 to 50 $\mu$m, preferably about 10 to 40 $\mu$m, is suitable, and suitable supports are polyethylene terephthalate, polyethylene naphthalate or like polyesters, polypropylene or like polyolefins, cellulose triacetate, cellulose diacetate or like cellulose derivatives, polyvinyl chloride or like vinyl resins, polycarbonate or like synthetic resins, aluminum, copper or other metals, glass or ceramics, etc.

Useful organic solvents for kneading the iron oxide particles and coating the resulting composition are acetone, methyl ethyl ketone, methyl isobutyl ketone, cyclohexanone or like ketones, methanol, ethanol, propanol, butanol or like alcohols, methyl acetate, ethyl acetate, butyl acetate, ethyl lactate, glycol acetate monoethyl ether, or like esters, diethyl ether, glycol dimethyl ether, glycol monoethyl ether, dioxane or like ethers, benzene, toluene, xylene or like aromatic hydrocarbons, methylene chloride, ethylene chloride, carbon tetrachloride, chloroform, ethylene chlorohydrin, dichlorobenzene or like chlorinated hydrocarbons, etc.

For coating the iron oxide containing mixture on a support, an air doctor coating method, a blade coating method, an air knife coating method, a squeeze coating method, a dip coating method, a reverse roll coating method, a transfer roll coating method, a kiss coating method, a cast coating method, and a spray coating method can be used. The details of these coating methods are described in *Coating Engineering*, pp. 253–277, Asakura Shoten (Mar. 20, 1971).

The suitable amount of the above binder in the final coating formed is about 30 to 600 parts by weight, preferably 50 to 150 parts by weight, per 300 parts by weight of the ferromagnetic powder. When a magnetic recording medium is a tape, the thickness of the dry coating of the magnetic layer thus becomes about 0.5 to 10 microns.

The magnetic layer coated on the support by the above method is dried after coating and, if desired, can be subjected to a treatment for orienting the magnetic powder in the layer. Suitable treatments for orienting the magnetic powder in the layer are disclosed in U.S. Pat. Nos. 1,949,840, 2,796,359, 3,001,891, 3,172,776, 3,416,949, 3,473,960, and 3,681,138; Japanese Pat. Publication Nos. 3427/1957, 28368/1964, 23624/1965, 23625/1965, 13181/1966, 13043/1973 and 39722/1973. If required, the magnetic layer can be subjected to a surface-smoothening treatment, or cut to the desired shape, thereby to form the magnetic recording material of this invention. Suitable surface-smoothening techniques are disclosed in U.S. Pat. Nos. 2,688,567, 2,998,325, and 3,783,023, and German Pat. Application (OLS) No. 2,405,222.

In the above orienting treatment for the magnetic layer, the orienting magnetic field can be either an AC or DC magnetic field with a field strength of about 500 to 2000 gauss. The drying temperature can range from about 50° to about 100° C, and the drying time is about 3 to 10 minutes.

In the surface-smoothening treatment of the magnetic layer, preferably a calendering method is used in which the magnetic layer is passed between a metal roll and a non-metallic roll while the layer is heated under pressure. A combination of a metal roll and a roll made of cotton and a combination of a metal roll and a roll made of a synthetic resin are especially preferred. The pressure used in this treatment is about 25 to 500 kg/cm, and the surface temperature of the metal roll is kept at about 35° to 150° C. The rate of the treatment is about 5 to 120 meters/min. When the pressure and temperature are below the lower limits of the above-specified ranges, the effect of the surface-smoothening treatment is difficult to achieve. Pressures and temperatures higher than the upper limits of the above specified ranges are not preferred because the support of the magnetic recording material is deformed. When the treating rate is less than about 5 meters/min the operating efficiency is low, and if the rate is about 120 meters/min, the operation is difficult.

The magnetic recording medium obtained in accordance with the present invention has a coercive force (Hc) of at least about 1000 Oe, and a saturation magnetization (Bm) of at least about 2,500 Gauss.

The magnetic recording material of the present invention provides superior video S/N ratio, magnetic print through of audio signal ratio and chroma output as well as envelope wave form characteristics to known magnetic recording materials, that is, in the magnetic recording material of the present invention, the envelope wave form fluctuation factor can improve by 3 to 9%, the video S/N ratio can improve about 1.5 dB, the magnetic print through of audio signal ratio can improve about 3 dB, and the chroma output can improve about 2.5 dB, in comparison with known magnetic recording materials.

The following examples are given to illustrate the present invention in greater detail. It will easily be recognized by one skilled in the art that all compositions, ratios, procedure orders and the like can be changed as long as the variations are within the scope of the present invention. Unless otherwise indicated herein, all parts, percents, ratios and the like are by weight.

EXAMPLE 1

| | parts by weight |
|---|---|
| Ferromagnetic Iron Oxide (as described in Tables 3 and 4) | 300 |
| Nitrocellulose | 80 |
| Dibutylphthalate | 14.5 |
| Nitrile Rubber | 10 |
| Castor Oil | 1 |
| Butyl Acetate | Suitable amount |

The above-described composition was dispersed in a ball mill for 48 hours, then butyl acetate was added to adjust the viscosity of the composition to 30 poises and a magnetic coating composition was obtained.

The thus-prepared coating solution was coated on one surface of a polyethylene terephthalate film having a thickness of 20 $\mu$ in a dry thickness of 7 $\mu$, and then dried.

The coated layer was then subjected to a super calender treatment and slit into tapes having ¾ inch width to obtain magnetic video tapes.

The x values and particle sizes of the ferromagnetic material (FeO$_x$) used for each sample are shown in Table 3 below.

In Table 3, A represents ferromagnetic iron oxides having particle sizes larger than 0.5 $\mu$ and x values larger than 1.45; B represents those having particle sizes larger than 0.5 $\mu$ and x values smaller than 1.45; C represents those having particle sizes smaller than 0.4 $\mu$ and x values smaller than 1.43; and D represents those having particle sizes smaller than 0.4 $\mu$ and x values larger than 1.43, and the actual particle sizes and values of these samples are shown in Table 4 below.

TABLE 3

| Sample No. | Ferromagnetic Iron Oxide | Ferromagnetic Iron Oxide |
|---|---|---|
| 1 | A-1 | — |
| 2 | — | B-1 |
| 3 | — | B-2 |
| 4 | — | B-3 |
| 5 | A-1 | B-2 |
| 6 | — | C-3 |
| 7 | — | C-2 |
| 8 | A-1 | C-3 |
| 9 | — | D-1 |
| 10 | — | D-2 |
| 11 | — | D-3 |
| 12 | A-1 | D-2 |
| 13 | B-1 | D-2 |
| 14 | B-2 | D-2 |
| 15 | B-3 | D-1 |
| 16 | B-3 | D-3 |
| 17 | B-4 | D-2 |
| 18 | B-5 | D-2 |
| 19 | C-1 | D-2 |
| 20 | C-2 | B-2 |

TABLE 4

| Ferromagnetic Iron Oxide | Particle Size ($\mu$) | "x" Value (FeO$_x$) |
|---|---|---|
| A-1 | 0.6 | 1.48 |
| B-1 | 0.5 | 1.45 |
| B-2 | 0.6 | 1.43 |
| B-3 | 0.6 | 1.33 |
| B-4 | 0.8 | 1.39 |
| B-5 | 0.95 | 1.39 |
| C-1 | 0.35 | 1.39 |
| C-2 | 0.35 | 1.40 |
| C-3 | 0.35 | 1.33 |
| D-1 | 0.35 | 1.45 |
| D-2 | 0.35 | 1.50 |
| D-3 | 0.40 | 1.43 |

The magnetic characteristics of Samples 1 to 20 as shown in Table 3 were measured, and envelope wave form fluctuation factors, video S/N ratios, magnetic print through of audio signal ratios and chroma outputs obtained are shown in Table 5 below.

TABLE 5

| Sample No. | Envelope Wave Form Fluctuation Factor (%) | Video S/N Ratio (dB) | Magnetic Print Through of Audio Signal Ratio (dB) | Chroma Output (dB) |
|---|---|---|---|---|
| 1 | 20 | −1.5 | 55 | −0.2 |
| 2 | 17 | −0.2 | 51 | +1.0 |
| 3 | 18 | −0.5 | 51 | +1.0 |
| 4 | 16 | +0.5 | 46 | +2.0 |
| 5 | 19 | −1.2 | 52 | +0.4 |
| 6 | 13 | +2.0 | 36 | −1.7 |
| 7 | 14 | +2.0 | 38 | −1.2 |
| 8 | 16 | +0.2 | 44.5 | −0.9 | tape recorder (Model CR-6000, manufactured by Victor Co. of Japan Ltd.).

It can be seen from these results that the combination B + D is superior to the other combinations.

The degree of effects obtained from the results in Table 5 are shown in Table 6.

TABLE 5-continued

| Sample No. | Envelope Wave Form Fluctuation Factor (%) | Video S/N Ratio (dB) | Magnetic Print Through of Audio Signal Ratio (dB) | Chroma Output (dB) |
| --- | --- | --- | --- | --- |
| 9 | 13 | +1.0 | 51 | −2.5 |
| 10 | 14 | +1.0 | 54 | −2.0 |
| 11 | 14 | +1.5 | 48 | −1.2 |
| 12 | 14 | −0.3 | 54 | −1.4 |
| 13 | 12 | +0.8 | 52.5 | −0.1 |
| 14 | 12 | −0.6 | 53 | ±0 |
| 15 | 11 | +1.2 | 49 | +0.3 |
| 16 | 11 | +1.1 | 47.5 | +0.6 |
| 17 | 12 | +9 | 52 | ±0 |
| 18 | 12 | +1.0 | 52.5 | +0.2 |
| 19 | 14 | +1.5 | 46 | −1.4 |
| 20 | 15 | +1.2 | 44 | −0.2 |

TABLE 6

| Combination of Magnetic Substance | Mixing Ratio (by weight) | Envelope Wave Form Fluctuation Factor | Video S/N Ratio | Magnetic Print Through of Audio Signal Ratio | Chroma Output |
| --- | --- | --- | --- | --- | --- |
| A | — | Poor | Poor | Good | Fair |
| A+B | 1:1 | Poor | Slightly poor | Good | Good |
| A+C | 1:1 | Slightly poor | Good | Slightly poor | Poor |
| A+D | 1:1 | Slightly poor | Slightly poor | Good | Poor |
| B | — | Poor | Good | Good | Good |
| B+C | 1:1 | Slightly poor | Good | Poor | Fair |
| B+D | 1:1 | Excellent | Good | Good | Good |
| C | — | Slightly poor | Good | Poor | Poor |
| C+D | 1:1 | Slightly poor | Good | Slightly poor | Poor |
| D | — | Fair | Good | Good | Poor |

(Note: Poor < Slightly poor < Fair < Good < Excellent)

From these results the combination B + D was demonstrated to not only exhibit a very superior envelope wave form fluctuation factor but also to provide a balance in the other characteristics. While the other combinations were demonstrated to be inferior in not only the envelope wave form fluctuation factor but also in the video S/N ratio, magnetic print through of audio signal ratio and chroma output.

In this example, the magnetic materials as shown in Table 3 were obtained by changing particle sizes and degrees of oxidation during the production of maghemite and magnetite, and are roughly divided into four groups, A, B, C and D, as shown in Table 4 depending upon the particle sizes and degrees of oxidation.

Further, metallic cobalt was added in an amount of 1.0 to 3.5 atom % to adjust the coercive force to a range of 520 to 570 Oe. In this case, Fe + Co was used instead of Fe and the ratio was obtained to obtain $x$ value of $FeO_x$.

Combinations of the above-described magnetic materials A, B, C and D can include A, B, C, D, A+B, A+C, A+D, B+C, B+D and C+D (in this example, the mixing ratio is 1:1 by weight). Combinations as shown in Table 3 are based on these 10 combinations.

The results shown in Table 5 on envelope wave form fluctuation factor (%), video S/N ratio (dB), magnetic print through of audio signal ratio (dB) and chroma output (dB) were obtained using the 20 samples as shown in Table 3 and a ¾ inch wide helical type video

EXAMPLE 2

It is clear from Example 1 that the combination B + D is superior in envelope wave form fluctuation factor and other magnetic characteristics to the other combinations.

In Example 2, mixing ratio of B and D was investigated as follows.

Magnetic layers having magnetic materials as shown in Table 7 were coated on one surface of a polyethylene terephthalate film having a thickness of 20 $\mu$ to obtain a dry thickness of 7 $\mu$ and then dried in the same manner as described in Example 1. The coated films were then subjected to a super calender treatment and split to obtain ¾ inch wide video tapes.

Here in this example, magnetic material B was an iron oxide having a particle size of 0.6 $\mu$ and a degree of oxidation ($x$ value of $FeO_x$) of 1.39 and magnetic material D was an iron oxide having a particle size of 0.35 $\mu$ and $x$ value of 1.50.

TABLE 7

| Sample No. | Magnetic Material B (wt %) | Magnetic Material D (wt %) | Envelope Wave Form Fluctuation Factor (%) | Video S/N Ratio (dB) | Magnetic Print Through of Audio Signal Ratio (dB) | Chroma Output (dB) |
| --- | --- | --- | --- | --- | --- | --- |
| 21 | 0 | 100 | 14 | +1.0 | 54 | −2.0 |
| 22 | 10 | 90 | 13.2 | +1.3 | 53.5 | −1.5 |
| 23 | 20 | 80 | 12 | +1.4 | 52.5 | −1.0 |
| 24 | 30 | 70 | 11.3 | +1.5 | 52 | −0.7 |
| 25 | 50 | 50 | 11 | +1.5 | 50.5 | +0.2 |
| 26 | 70 | 30 | 11.2 | +1.2 | 49.2 | +0.6 |
| 27 | 80 | 20 | 12.2 | +1.1 | 48.2 | +1.2 |
| 28 | 90 | 10 | 15 | +0.8 | 47.6 | +1.5 |
| 29 | 100 | 0 | 17 | +0.5 | 47 | +1.8 |

Nine mixing ratios of both magnetic materials having differences of about 10% were used.

The results are shown in Table 7, and it has been found that the effect of the present invention is obtained when the mixing ratio of both magnetic materials ranges from about 1:4 to 4:1 by weight.

The envelope wave form fluctuation factor and the other magnetic characteristics were demonstrated to be superior within this range.

As described above, the present invention is based on the effect obtained by mixing B and D when magnetic materials are divided into 4 groups of A, B, C and D depending upon the degree of oxidation and the particle size.

The effect of the present invention can be obtained when cobalt or another metal element is added to the ferromagnetic iron oxide of the present invention.

Further, the binder, plasticizing agent, antistatic agent and other additives, and the support can be those generally used.

In addition, the material of the present invention was found have superior demagnetizing of magnetic signals and in addition envelope wave form fluctuation factor, video S/N ratio, magnetic print through of audio signal ratio and chroma output.

Further, it was found that the difference in coercive forces of the magnetic material B and D of the present invention is desired to be less than 15%.

While the invention has been described in detail and with reference to specific embodiments thereof, it will be apparent to one skilled in the art that various changes and modifications can be made therein without departing from the spirit and scope thereof.

What is claimed is:

1. A magnetic recording material which comprises a support having thereon a magnetic recording layer consisting essentially of a ferromagnetic material and a binder, wherein the ferromagnetic material is a mixture of (1) a Berthollide iron oxide having a particle size of about 0.5 $\mu$ or larger and a degree of oxidation represented by the value of $x$ in $FeO_x$ of $1.33 < x \leq 1.45$ and (2) a Berthollide iron oxide having a particle size of about 0.4 $\mu$ or smaller and a degree of oxidation represented by the value of $x$ in $FeO_x$ of $1.43 \leq x < 1.50$, where the weight ratio of Berthollide iron oxide (1) to Berthollide iron oxide (2) ranges from about 1:4 to 4:1.

2. The magnetic recording material as described in claim 1, wherein said iron oxide contains a divalent metal element other than iron to adjust the coercive force of the iron oxide and the content of said metal element is about 0.5 to 15 atom %.

3. The magnetic recording material of claim 2, wherein said metal element is at least one of cobalt, magnesium, copper, chromium, manganese, nickel, zinc, molybdenum, tin, antimony, tellurium, rhodium, barium, lanthanum, cerium, tungsten or bismuth.

4. The magnetic recording material of claim 1, wherein the difference in coercive force of said Berthollide iron oxide (1) and said Berthollide iron oxide (2) is less than about 15%.

5. The magnetic recording material of claim 1, wherein the envelope wave form fluctuation factor is about 12% or less.

6. The magnetic recording material of claim 1, wherein the magnetic recording layer further contains about 0.5 to 20 parts by weight of dispersing agent based on 100 parts by weight of binder.

7. The magnetic recording material of claim 1, wherein the magnetic recording layer further contains about 0.2 to 20 parts by weight of lubricant based on 100 parts by weight of binder.

8. The magnetic recording material of claim 1, wherein the magnetic recording layer further contains about 0.5 to 20 parts by weight of abrasives based on 100 parts by weight of binder, and said abrasives have a particle size of about 0.05 to 2 microns.

9. The magnetic recording material of claim 1, wherein the magnetic recording layer further contains about 0.5 to 1% by weight of an organic anti-static agent based on the weight of the ferromagnetic material.

10. The magnetic recording material of claim 1, wherein the magnetic recording layer further contains about 5% by weight of inorganic anti-static agent based on the weight of the ferromagnetic material.

11. The magnetic recording material of claim 1, wherein the thickness of the magnetic recording layer is about 0.5 to 20 microns.

12. The magnetic recording material of claim 1, wherein the support is non-magnetic and the thickness of the support is about 10 to 125 microns.

13. In a magnetic recording material which comprises a support having thereon a magnetic recording layer, the improvement which comprises a ferromagnetic material which is a mixture of (1) a Berthollide iron oxide having a particle size of about 0.5$\mu$ or larger and a degree of oxidation represented by the value of $x$ in $FeO_x$ of $1.33 < x \leq 1.45$ and (2) a Berthollide iron oxide having a particle size of about 0.4$\mu$ or smaller and a degree of oxidation represented by the value of $x$ in $FeO_x$ of $1.43 \leq x < 1.50$, where the weight ratio of Berthollide iron oxide (1) to Berthollide iron oxide (2) ranges from about 1:4 to 4:1.

* * * * *